March 8, 1966  R. J. HAYES  3,238,644
CHILD'S SWITCHBOARD PHONOGRAPH

Filed Oct. 3, 1963  2 Sheets-Sheet 1

INVENTOR.
ROBERT J. HAYES
BY
ATTORNEYS

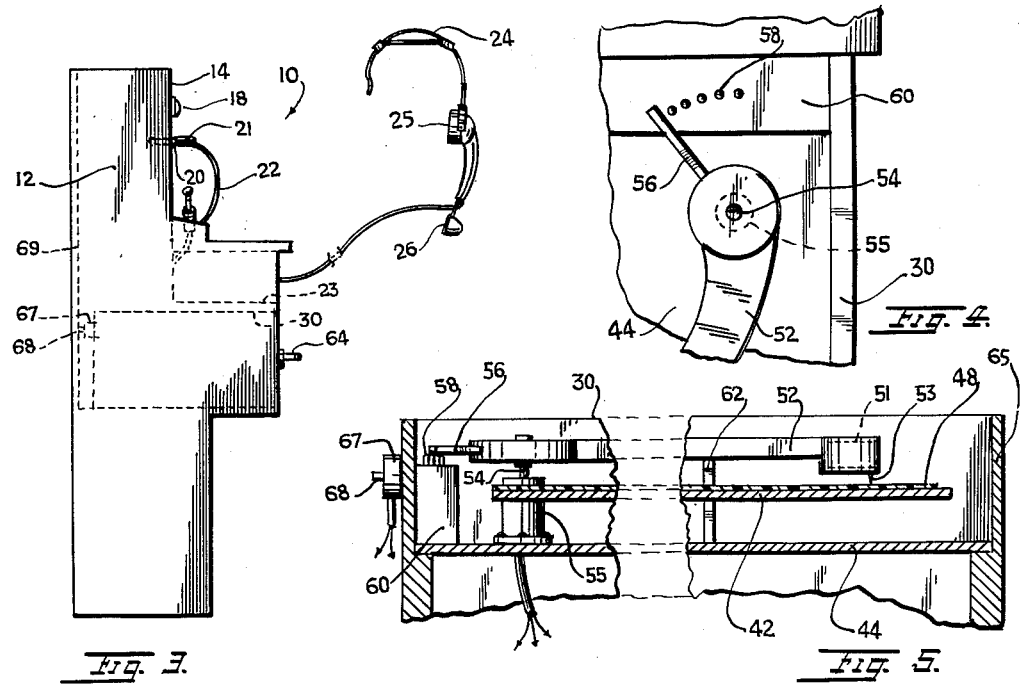
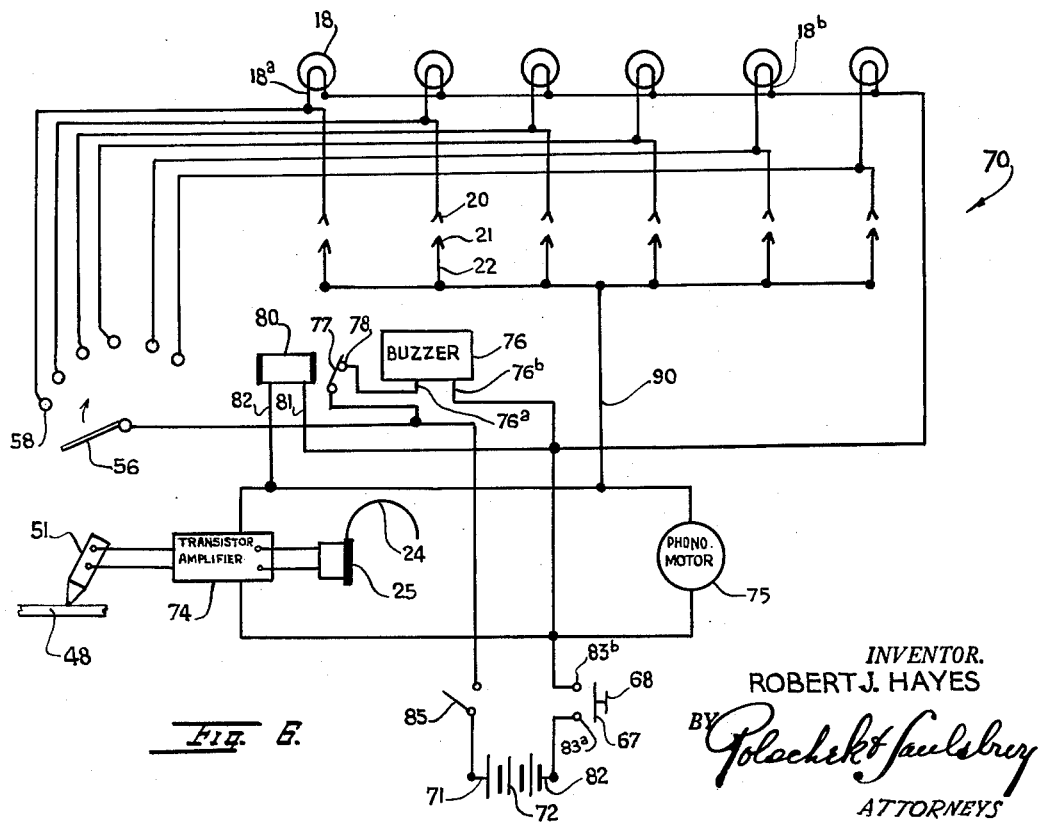

United States Patent Office 3,238,644
Patented Mar. 8, 1966

3,238,644
CHILD'S SWITCHBOARD PHONOGRAPH
Robert J. Hayes, 1701 E. 48th St., Brooklyn 34, N.Y.
Filed Oct. 3, 1963, Ser. No. 313,557
10 Claims. (Cl. 35—60)

This invention relates to the art of toy or game apparatus and more particularly concerns a child's switchboard phonograph.

According to the invention there is provided a game or toy device in the form of a simulated telephone switchboard. The child using the same performs operations simulating those of a telephone switchboard operator. The device includes a cabinet in the form of a small switchboard with lamps to indicate telephone subscribers and jacks into which plugs may be inserted to simulate connection of a caller with one of the subscribers' telephones. A simulated switchboard headset is provided for use by the child operator of the device. The device includes a phonograph mounted in a drawer which slides in and out of the switchboard cabinet. A record having multiple tracks can be mounted on a turntable of the phonograph. A tone arm of a phonograph pickup can be set at a selected track of the record. When the drawer containing the phonograph is closed, a buzzer sounds simulating the calling of a subscriber and a particular lamp lights on the switchboard. The child operator then inserts one of a plurality of plugs into a jack under the lighted lamp. This starts the motor of the phonograph, energizes an audio amplifier and stops the buzzer. The child will be able to hear the recording on the selected track of the record through the earphone of the headset attached to the switchboard. This simulates receiving of an audible telephone message from the called telephone subscriber.

It is therefore one object of the invention to provide a toy apparatus simulating a telephone switchboard and including a phonograph for providing selected audible messages heard on a telephone headset.

Another object is to provide a toy apparatus simulating a telephone switchboard, in which telephone plugs are provided for insertion into jacks under lamps to start a phonograph motor and amplifier in the apparatus.

A further object is to provide an educational toy apparatus which will serve to teach basic methods of operation of a telephone switchboard and phonograph.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 3 is a side view of the apparatus of FIG. 1, with drawer closed.

FIG. 4 is a plan view on an enlarged scale of part of the phonograph.

FIG. 5 is a vertical sectional view on an enlarged scale taken on line 5—5 of FIG. 1, parts being broken away.

FIG. 6 is a diagram of an electrical circuit employed in the apparatus.

Figure 1:
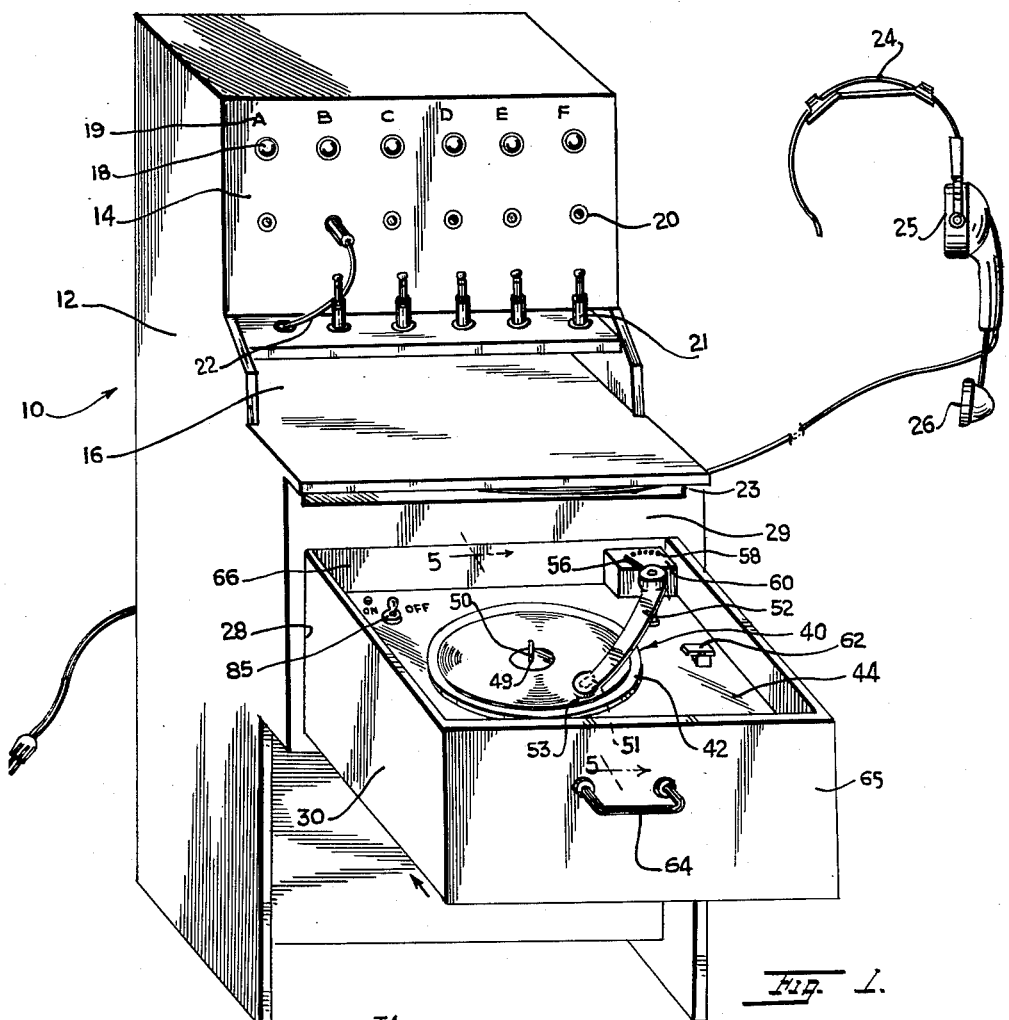
FIG. 1 is a perspective view of a simulated telephone switchboard apparatus with open drawer showing a phonograph therein.
Figure 2:
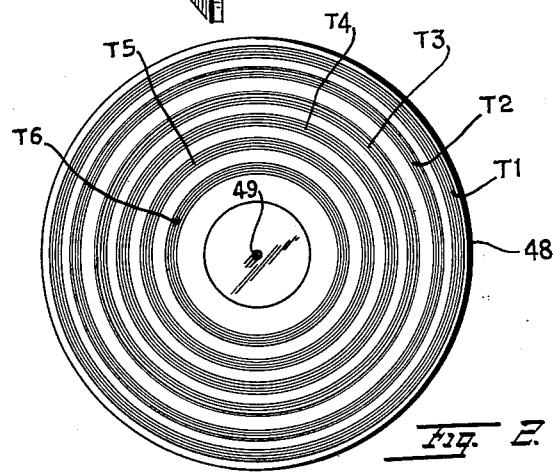
FIG. 2 is a plan view of a phonograph record which may be used in the apparatus.

Referring first to FIGS. 1–5, there is shown the toy or game apparatus 10 including a cabinet 12. The cabinet has an upright panel 14 set back from a horizontal plug board 16. The panel 14 has a horizontal row of lamps 18 which may have suitable indicia 19 representing simulated telephone subscribers. Under each of the lamps is a jack 20. On board 16 are plugs 21 for inserting into any of jacks 20, respectively. Each plug is attached to a long cord 22 terminating in an electrical circuit housed within the cabinet 12. A shelf 23 is located underneath the plug board 16 for storing a headset 24 when not in use. The headset has an operable earphone 25 and a simulated inoperable mouthpiece or microphone 26.

Underneath the shelf 23 is an opening 28 in the front wall 29 of the cabinet. A rectangular drawer 30 is slidably disposed in this opening and can be completely housed within the cabinet as shown in dotted lines in FIG. 3. In the drawer is a phonograph 40 including a rotatable horizontal turntable 42 driven by a motor inside the drawer. The turntable is located just above a horizontal shelf 44 in the drawer; see FIGS. 1, 4 and 5. A phonograph record 48 having multiple tracks T1–T6 may be mounted on the turntable for playing. The record has a central opening 49 which engaged on spindle 50 of the turntable.

The phonograph includes a tone arm 52 having a pickup cartridge 51 at one end with a needle 53 for following any one of the tracks upon which the tone arm may be placed. The tone arm is pivotally mounted on a shaft 54 carried by a post 55; see FIG. 5. Extending radially outwardly of the rear end of the tone arm near post 55 is a springy electrical switch arm 56. This arm is located so that it will contact any one of a plurality of spaced fixed electrical contacts 58 mounted on a switch box 60 at the rear end of shelf 44. The particular contact which arm 56 will engage will depend on which track of the record is selected for playing. When not in use the tone arm 52 may be placed on an arm rest 62 at one side of the drawer. A handle 64 is provided at the front wall 65 of the drawer to facilitate sliding the drawer in and out of cabinet 12.

On the rear wall 66 of the drawer is a push-button switch 67 with button 68 located to be closed by contact with rear wall 69 of the cabinet when the drawer is fully inserted into the cabinet as shown in FIG. 3.

FIG. 6 shows the electrical circuit 70 of the apparatus. It will be noted that one terminal 18$^a$ of each of lamps 18 is connected to a different one of the fixed contacts 58. Arm 56 is connected to one terminal 71 of a battery 72 which may be located in the upper part of the cabinet 12. The pickup cartridge 51 is connected to a transistor amplifier 74 for amplification of the audio signals picked up from the record 48. The phonograph motor 75 which drives turntable 42 and amplifier 74 each have one terminal connected to terminal 83$^b$ of the switch 67. A buzzer 76 has one terminal 76$^a$ connected to battery terminal 71 through normally closed contacts 77, 78 of a relay 80. Both contact 77 and one terminal 81 of the relay are connected to battery terminal 71 via switch 85. The other battery terminal 82 is connected to normally open contact 83$^a$ of the push-button switch 67 which is operated by button 68. The other terminal 76$^b$ of the buzzer 76 is connected to switch contact 83$^b$.

The cords 22 are connected to the respective plugs 21. The cords 22 are connected together via wire 90 to terminals of relay 80, amplifier 74 and motor 75. One terminal 18$^b$ of each of the lamps is connected to switch contact 83$^b$. Earphone 25 is connected to the amplifier 74 for audibly reproducing signals received therefrom. Jacks 20 are connected to contacts 58, respectively.

In operation of the apparatus the child operator will open the drawer 30 and set the on-off switch 85 on shelf 44 to ON position. He will then place the tone arm 52 of phonograph 40 upon any one of the concentric tracks T1–T6 of a record 48 mounted on turntable 42. This will cause arm 56 to contact one of the arcuately arranged contacts 58 corresponding to the radial position of the selected one of the tracks. The child operator will then close the drawer 30 so that switch 67 closes. This causes one of the lamps 18 to light corresponding to the particular track selected and corresponding contact 58 with which arm 56 is closed. At the same time the buzzer 76 will sound since its circuit is closed through switch 67.

The child operator then inserts any one of plugs 21 into the particular jack under the lighted lamp. This will cause the relay 80 to become energized and contacts 77, 78 will open so that the buzzer stops sounding. At the same time, motor 75 and amplifier 74 will become energized. The motor will turn the turnable and record and the amplifier will amplify the audio signals picked up by the cartridge 51. The child can hear the audible recording reproduced by earphone 25 by placing the headset 24 over his head. The child operator can cut off the recording by pulling the plug 21 out of jack 20. Then by opening the drawer the operator can select another track for playing. If a plug 21 is inserted in a jack under an unlighted lamp the connection will not be completed and the buzzer will keep sounding.

When the apparatus is not in use switch 85 should be set at OFF position. If the child should forget to do this, buzzer 76 will sound while the drawer is closed to remind him to open the switch.

The apparatus thus operates in a manner simulating the operation of a telephone switchboard with a comparatively large working surface. A child can be amused, entertained and instructed both by the physical manipulations of the apparatus required and by the recordings to which he listens. They may be stories, educational subjects such as history, geography, languages or any other subject matter of interest to children. It should be understood that these recordings may be on any speed and style of records and instead of being applied to phonograph recording disks, can be equally well applied to record tape in a manner well known in the art and the apparatus adapted to carry out the principles and features of the invention.

Instead of a battery, the apparatus may be provided with a power cord which may be connected to an external source of electric power.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A telephone switchboard and phonograph apparatus, comprising a cabinet having a lamp and jack panel and a plug board carrying a plurality of plugs, electric cords connected to the plugs and terminating at an electric circuit, said panel having a plurality of lamps and a plurality of jacks located adjacent to the lamps respectively, said lamps and jacks being connected in said circuit, a power supply connected to said circuit for energizing the same, a drawer movably mounted to slide in and out of the cabinet, and a phonograph in the drawer, said phonograph having a turntable for carrying a phonograph record, a pivotally mounted tone arm with a cartridge in said circuit at one end for picking up a recording from said record, switch means carried by said tone arm and connected in said circuit with said lamps, and an earphone and amplifier connected in circuit with said cartridge; and a push-button switch in said circuit carried by said drawer; each of said lamps associated with one of a plurality of predetermined positions of said tone arm, whereby one of the lamps lights up when the drawer is closed inside the cabinet and the tone arm is in a predetermined position over the turntable to close said switch means, and whereby said amplifier is energized when one of the plugs is inserted in a jack adjacent to the lighted lamp so that a recording on the record is rendered audible on said earphone.

2. A telephone switchboard and phonograph apparatus, comprising a cabinet having a lamp and jack panel and a plug board carrying a plurality of plugs, electric cords connected to the plugs and terminating at an electric circuit, said panel having a plurality of lamps and a plurality of jacks located adjacent to the lamps respectively, said lamps and jacks being connected in said circuit, a power supply connected to said circuit for energizing the same, a drawer movably mounted to slide in and out of the cabinet, and a phonograph in the drawer, said phonograph having a turntable for carrying a phonograph record, a pivotally mounted tone arm with a cartridge in said circuit at one end for picking up a recording from said record, switch means carried by said tone arm and connected in said circuit with said lamps, and an earphone and amplifier connected in circuit with said cartridge; and a switch connected in said circuit, each of said lamps associated with one of a plurality of predetermined positions of said tone arm, whereby to light one of the lamps when the tone arm is in a predetermined position associated with said one lamp over the turntable to close said switch means, and whereby said amplifier is energized when one of the plugs is inserted in a jack adjacent to the lighted lamp so that a recording on the record is rendered audible on said earphone.

3. A telephone switchboard and phonograph apparatus, comprising a cabinet having a lamp and jack panel and a plug board carrying a plurality of plugs, electric cords connected to the plugs and terminating at an electric circuit, said panel having a plurality of lamps and a plurality of jacks located adjacent to the lamps respectively, said lamps and jacks being connected in said circuit, a power supply connected to said circuit for energizing the same, and a phonograph in the cabinet, said phonograph having a turntable for carrying a phonograph record, a pivotally mounted tone arm with a cartridge in said circuit at one end for picking up a recording from said record, switch means carried by said tone arm and connected in said circuit with said lamps, each of said lamps associated with one of a plurality of predetermined positions of said tone arm, and an earphone and amplifier connected in circuit with said cartridge; and a switch connected in said circuit to light one of the lamps when the tone arm is in a predetermined position associated with said one lamp over the turntable to close said switch means, and whereby said amplifier is energized when one of the plugs is inserted in a jack adjacent to the lighted lamp so that a recording on the record is rendered audible on said earphone.

4. A telephone switchboard and phonograph apparatus, comprising a cabinet, a plurality of lamps carried by the cabinet, a plurality of jacks carried by the cabinet respectively located adjacent the lamps, a plurality of plugs having long electric cords respectively attached thereto, said lamps, jacks and cords being connected in an electric circuit inside the cabinet, a power supply connected to the circuit to energize the same, a switch connected in circuit for lighting a lamp when the switch is closed, and a phonograph in the cabinet, said phonograph having a turntable for carrying a phonograph record, a pivotally mounted tone arm with a cartridge in said circuit, at one end for picking up a recording from said record, switch means carried by said tone arm and connected in said circuit with said lamps, each of said lamps associated with one of a plurality of predetermined positions of said tone arm, and an earphone and amplifier connected in circuit with said cartridge; whreby one of the lamps lights up when the tone arm is positioned associated with said one lamp over the turntable to close said switch means, and whereby the amplifier is energized when one of the plugs is inserted in a jack adjacent to the lighted lamp so that a recording on the record is rendered audible on said earphone.

5. A telephone switchboard and phonograph apparatus, comprising a cabinet having a lamp and jack panel and a plug board carrying a plurality of plugs, electric cords connected to the plugs and terminating at an electric circuit, said panel having a plurality of lamps and a plurality of jacks located adjacent to the lamps respectively, said lamps and jacks being connected in said circuit, a power supply connected to said circuit for energizing the same, a drawer movably mounted to slide in and out of the cabinet, and a phonograph in the drawer, said phonograph having a turntable for carrying a phonograph record, a pivotally mounted tone arm with a cartridge in said circuit, at one end for picking up a recording from said record, switch means carried by said tone arm and connected in said circuit with said lamps, each of said lamps associated with one of a plurality of predetermined positions of said tone arm, and an earphone and amplifier connected in circuit with said cartridge; a buzzer connected in said circuit, and a push-button switch in said circuit carried by said drawer, whereby one of the lamps lights up and the buzzer sounds when the drawer is closed inside the cabinet to close the push-button switch and the tone arm is in a predetermined position associated with said one lamp over the turntable to close said switch means, and whereby the buzzer stops sounding and the amplifier is energized when one of the plugs is inserted in a jack adjacent to the lighted lamp so that a recording is rendered audible on the earphone.

6. A telephone switchboard and phonograph apparatus, comprising a cabinet having a lamp and jack panel and a plug board carrying a plurality of plugs, electric cords connected to the plugs and terminating at an electric circuit, said panel having a plurality of lamps and a plurality of jacks located adjacent to the lamps respectively, said lamps and jacks being connected in said circuit, a power supply connected to said circuit for energizing the same, a drawer movably mounted to slide in and out of the cabinet, and a phonograph in the drawer, said phonograph having a turntable for carrying a phonograph record, a pivotally mounted tone arm with a cartridge in said circuit, at one end for picking up a recording from said record, switch means carried by said tone arm and connected in said circuit with said lamps, each of said lamps associated with one of a plurality of predetermined positions of said tone arm, and an earphone and amplifier connected in circuit with said cartridge; a buzzer and a switch connected in said circuit, whereby one of the lamps lights up and the buzzer sounds when the switch is closed and the tone arm is in a predetermined position associated with said one lamp, over the turntable, and whereby the buzzer stops sounding and the amplifier is energized when one of the plugs is inserted in a jack adjacent to the lighted lamp so that a recording on the record is rendered audible on said earphone.

7. A telephone switchboard and phonograph apparatus, comprising a cabinet having a lamp and jack panel and a plug board carrying a plurality of plugs, electric cords connected to the plugs and terminating at an electric circuit, said panel having a plurality of lamps and a plurality of jacks located adjacent to the lamps respectively, said lamps and jacks being connected in said circuit, a power supply connected to said circuit for energizing the same, and a phonograph in the cabinet, said phonograph having a turntable for carrying a phonograph record, a pivotally mounted tone arm with a cartridge in said circuit, at one end for picking up a recording from said record, switch means carried by said tone arm and connected in said circuit with said lamps, each of said lamps associated with one of a plurality of predetermined positions of said tone arm, and an earphone and amplifier connected in circuit with said cartridge; a buzzer and a switch connected in said circuit, whereby one of the lamps lights up and the buzzer sounds when the switch is closed and the tone arm is in a predetermined position associated with said one lamp, over the turntable, and whereby the buzzer stops sounding and the amplifier is energized when one of the plugs is inserted in a jack adjacent to the lighted lamp so that a recording on the record is rendered audible on said earphone.

8. A telephone switchboard and phonograph apparatus, comprising a cabinet, a plurality of lamps carried by the cabinet, a plurality of jacks carried by the cabinet respectively located adjacent the lamps, a plurality of plugs having long electric cords respectively attached thereto, said lamps, jacks and cords being connected in an electric circuit inside the cabinet, a power supply connected to the circuit to energize the same, a switch connected in circuit for lighting a lamp when the switch is closed, and a phonograph in the cabinet, said phonograph having a turntable for carrying a phonograph record, a pivotally mounted tone arm with a cartridge in said circuit, at one end for picking up a recording from said record, switch means carried by said tone arm and connected in said circuit with said lamps, each of said lamps associated with one of a plurality of predetermined positions of said tone arm, and an earphone and amplifier connected in circuit with said cartridge; a buzzer and a relay connected in said circuit, said relay having normally closed contacts in circuit with the buzzer; whereby one of the lamps lights up and the buzzer sounds when the tone arm is positioned in a predetermined position associated with said one lamp, over the turntable and the switch is closed, and whereby the relay is energized to open the closed contacts for stopping the sounding of the buzzer when a plug is inserted in a jack adjacent to the lighted lamp, and whereby the amplifier is energized when said plug is inserted in said jack so that a recording on the record is rendered audible on said earphone.

9. A telephone switchboard and phonograph apparatus, comprising a cabinet having a vertical panel and horizontal plug board, a plurality of telephone plugs supported by said board, said board having a plurality of openings therein, electric cords connected to the plugs and extending through the openings respectively, said panel having a row of signal lamps and a row of jacks respectively located adjacent to the lamps for receiving any one of the plugs, said jacks, cords and lamps being connected in an electric circuit, a headset having an earphone connected in said circuit, a drawer movably mounted to slide in and out of said cabinet, a phonograph in said drawer, said phonograph including a turntable for carrying a multiple-track phonograph record, a motor for rotating the turntable, a power supply for energizing the circuit connected thereto, a tone arm pivotally mounted at one end and having a cartridge in said circuit, at the other end with a needle for picking up a recording from any track of the record, a switch arm in said circuit, extending outwardly of said one end of the tone arm, fixed switch contacts on a support located to be respectively contacted by the switch arm in each of a plurality of positions of said tone arm when the cartridge is located over respective tracks of the record, an amplifier connected in said circuit with said motor and said cartridge, a push-button switch carried by said drawer, said push-button switch being open when the drawer is extended from the cabinet and closed when the drawer is retracted inside the cabinet, and a buzzer connected in said circuit with said push-button switch, whereby the buzzer sounds and one of the lamps lights up when the tone arm is located in any one of said positions and the drawer is closed, and whereby the buzzer stops sounding, the motor starts turning the turntable, and the amplifier transmits audio signals audible in said earphone when any one of the plugs is inserted in the jacks adjacent to the lighted lamp.

10. A telephone switchboard and phonograph apparatus, comprising a cabinet having a vertical panel and horizontal plug board, a plurality of telephone plugs supported by said board, said board having a plurality of openings therein, electric cords connected to the plugs and extending through the openings respectively, said panel having a row of signal lamps and a row of jacks respectively located adjacent to the lamps for receiving any one of the plugs, said jacks, cords and lamps being connected in an electric circuit, a headset having an earphone connected in said circuit, a drawer movably mounted to slide in and out of said cabinet, a phonograph in said drawer, said phonograph including a turntable for carrying a multiple-track phonograph record, a motor for rotating the turntable, a power supply for energizing the circuit connected thereto, a tone arm pivotally mounted at one end and having a cartridge in said circuit, at the other end with a needle for picking up a recording from any track of the record, a switch arm in said circuit, extending outwardly of said one end of the tone arm, fixed switch contacts on a support located to be respectively contacted by the switch arm in each of a plurality of positions of said tone arm when the cartridge is located over respective tracks of the record, an amplifier connected in said circuit with said motor and said cartridge, a push-button switch in said circuit, carried by said drawer, said push-button switch being open when the drawer is extended from the cabinet and closed when the drawer is retracted inside the cabinet, a buzzer and a relay connected in said circuit, said relay having normally closed contacts in series with the buzzer; whereby the buzzer sounds and one of the lamps lights up when the tone arm is located in any one of said positions and the drawer is closed to close said push-button switch; and whereby the relay is energized to open the closed contacts and stop sounding of the buzzer, the motor is energized to start turning the turntable, and the amplifier transmits audio signals audible in said earphone when any one of the plugs is inserted in the jacks adjacent to the lighted lamp.

References Cited by the Examiner

UNITED STATES PATENTS

| 2,110,358 | 3/1938 | Dreisbach | 35—35.3 X |
| 2,664,665 | 1/1954 | Rozenoff | 46—33 X |
| 2,973,586 | 3/1961 | Robertson | 35—8 |

FOREIGN PATENTS

| 1,210,380 | 9/1959 | France. |
| 797,737 | 7/1958 | Great Britain. |

EUGENE R. CAPOZIO, *Primary Examiner.*